(12) United States Patent
Girout et al.

(10) Patent No.: US 7,854,440 B2
(45) Date of Patent: Dec. 21, 2010

(54) BICYCLE ADAPTED TO DIFFERENT FORMS OF CYCLING

(75) Inventors: Guillaume Girout, Cergy (FR); Georges Girout, Grisy les Platres (FR)

(73) Assignee: DAGG, Grisy-les-Platres (FR)

( * ) Notice: Subject to any disclaimer, the term of this patent is extended or adjusted under 35 U.S.C. 154(b) by 183 days.

(21) Appl. No.: 12/143,325

(22) Filed: Jun. 20, 2008

(65) Prior Publication Data

US 2008/0315553 A1    Dec. 25, 2008

(30) Foreign Application Priority Data

Jun. 21, 2007  (FR)  ................... 07 55938

(51) Int. Cl.
*F16H 7/10*  (2006.01)
(52) U.S. Cl. ............... 280/259; 280/281.1; 474/112
(58) Field of Classification Search ............... 280/259, 280/281.1; 474/112
See application file for complete search history.

(56) References Cited

U.S. PATENT DOCUMENTS

| 697,944 | A | * | 4/1902 | Johnson | ................ 384/431 |
|---|---|---|---|---|---|
| 4,808,147 | A | | 2/1989 | Graham | |
| 6,612,597 | B2 | * | 9/2003 | Baker et al. | ................ 280/204 |
| 6,895,834 | B1 | | 5/2005 | Baatz | |
| 7,217,037 | B2 | * | 5/2007 | Dodman et al. | ............. 384/538 |
| 2008/0238028 | A1 | * | 10/2008 | Yamanaka | ............... 280/281.1 |
| 2008/0268994 | A1 | * | 10/2008 | Bushnell | ..................... 474/112 |

FOREIGN PATENT DOCUMENTS

| CH | 260468 | 3/1949 |
|---|---|---|
| EP | 0 019 420 A1 | 11/1980 |
| FR | 548 418 | 1/1923 |
| GB | 464561 | 4/1937 |

* cited by examiner

*Primary Examiner*—Kevin Hurley
(74) *Attorney, Agent, or Firm*—Patterson Thuente Christensen Pedersen, P.A.

(57) ABSTRACT

A bicycle adaptable to different forms of cycling. The bicycle includes a frame modification of the location of the crankshaft unit in the frame. The bicycle frame includes a crankset box forming a main housing. The crankset box is positioned at the junction of first and second rods. A detachable body member is mounted in the main housing, and includes a special housing that may be centered or off center relative to the base of the detachable body member.

10 Claims, 6 Drawing Sheets

BICYCLE ADAPTED TO DIFFERENT FORMS OF CYCLING

RELATED APPLICATION

The present application claims priority to French Application No. 07 55938 filed Jun. 21, 2007, which is incorporated herein in its entirety by reference.

TECHNICAL FIELD

The present invention pertains to a bicycle that can be adapted to different forms of cycling.

BACKGROUND OF THE INVENTION

A bicycle generally has a frame. Whatever the form of cycling planned or whoever may be the user, frames have a substantially similar geometry. This geometry is characterized by the presence of a first rod, a second rod, and a third rod associated with a hinge, the assembly forming a support structure. The three rods as well as the hinge are such that their axes of development are situated in a same plane called the plane of the frame. The rods and the hinge are joined in sets of two. Furthermore, a frame of this kind has a rear wheel support structure. The rear wheel support structure is mounted on the second rod at two different places.

Two elements are mounted on said frame. More particularly, a saddle, a handlebar associated with a front fork and a front wheel, a rear wheel and a crankset. The crankset and rear wheel are rotationally integral with each other, at least in one sense of rotation. To this end, the crankset and the rear wheel are connected by a chain.

The different morphologies of users in the different types of cycling practices make it necessary to have a wide range of frames. Indeed, the user's position on a bicycle is not the same depending on the different practices used since the needs in terms of physical performance, aerodynamic qualities and user comfort are not the same. Present-day bicycles have many elements whose characteristics vary from one bicycle to another depending on the form of cycling planned.

For example, the geometry of a frame specially designed for the triathlon is such that it fosters comfort and efficiency when the user is riding with aerobars. This means especially that there is a shaft between the saddle and the crankset as well as rods associated with the hinge that are relatively short compared with a frame designed for peloton racing. This geometry is aimed at giving the user a more forward position so that the user can use the aerobars more comfortably and at facilitating the muscular transition from cycling to running during a triathlon. This geometry makes the bicycle very unwieldy and hence dangerous to use in peloton conditions or in bends taken at high speeds.

Top-of-the-range bicycles designed for road competition are very rigid so to provide maximum efficiency. This extreme rigidity is often obtained to the detriment of comfort. These top-of-the-range bicycles are thus not comfortable for long-distance use and for use on roads whose surfaces are not perfectly smooth. The many jolts suffered by the cyclist and their intensity also cause considerable additional muscle fatigue. Furthermore, the bicycle keeps bouncing off the uneven features on the road, the wheels lose contact with the road and this causes a loss of traction and hence the loss of part of the energy provided by the cyclist while pedaling.

The frames are thus classified in categories such as for example against-the-clock (or "time trial") frames, road-race frames, training frames, or again triathlon frames. However, their geometry is suited to only one type of cycling whereas many users do not restrict themselves to only one form. The users therefore have to choose between several frames, one for each form, or have only one frame suited to only one form but which they must also use for the others even when they are adapted thereto. This therefore entails costs in equipment or costs in terms of performance, comfort and safety.

The fact that different geometries are needed to adapt to the needs of a maximum range of morphologies of users and a maximum range of forms of cycling also gives rise to drawbacks for frame manufacturers. Most bicycle frame manufacturers, and especially manufacturers of carbon frames, find it impossible to manufacture numerous sizes and geometries of frames because of the costs entailed. The manufacturers of carbon frames therefore tend to propose a limited number of different frame sizes. This limits the number of users who can use their frames. A proportion of the users having body member shapes less common than other users, for example users smaller then the majority of cyclists or users for whom the ratio between torso length and leg length is greater or smaller than that of the majority of the cyclists. These users therefore can not find top-of-the-range carbon frames with a size corresponding to their body member shape.

Italian patent TV94A000114 describes a bicycle frame device comprising a main shell or housing for the crankset in which a detachable body member is mounted. The detachable body member comprises a special housing that can be horizontally off-centered. The crankset is mounted in the special housing. Thus, depending on the detachable body member introduced into the main housing and more particularly depending on the position of the special housing in said detachable body member, the crankset can be situated horizontally at different positions on the frame relative to the saddle.

However, a horizontal shift of this kind, while it enables the angle of the axis defined by the position of the saddle and of the crankset to be adjusted, cannot easily be adapted to all body member shapes of users because there are few possibilities of positioning the crankset. Furthermore, it is still difficult to define a position that is made to measure for every user, for it is difficult to adapt both the value of the distance between the saddle and the crankset and the angle of the axis between the crankset and the saddle. Similarly, a device of this kind in no way modifies the rigidity of a frame of this kind.

Swiss patent CH-A-260 468 and U.S. Pat. No. 4,808,147 each describe a bottom bracket assembly comprising a circular-based cylinder (detachable body member) provided with a special housing designed to receive the pedal, the special housing being off-centered relative to the axis of the detachable body member. The detachable body member is axially blocked in the bracket assembly casing. It is possible to adjust the angular position of the special housing.

The drawback of the solutions proposed by the '468 Swiss patent and the '147 U.S. patent is that the cylinders are blocked only axially in the bracket assembly casing. Under the pressure communicated by the pedaling, it is possible that the detachable body member, owing to its circular-based cylindrical shape, will shift rotationally in its support. The position of the special housing is thereby modified. This is a major drawback since the purpose of these inventions is precisely to achieve the setting that results from the position of the special housing.

These devices therefore do not enable the efficient adapting of one bicycle to several users or several forms of cycling.

SUMMARY OF THE INVENTION

The device according to the invention makes it possible to propose a bicycle whose frame can be adapted to more body member shapes of users and more types of cycling than present-day frame. To this end, the device of the invention provides for the easy modification of a bicycle user's position on said bicycle. The frame of the invention provides for adapting the rigidity of the frame to the form of cycling planned for the frame.

To resolve the problem of a lack of modularity for one and the same bicycle, the invention plans to make the structure of a bicycle modulable at several points. More particularly, the invention provides for a device that can be used to modify the geometry of the elements of the bicycle influencing the user's position, typically the distance between the saddle and the crankset as well as the tilt of the axis defined by the position of the saddle relative to the crankset. Furthermore, the device of the invention provides for adapting the rigidity of the frame to the use made of said frame.

In order to easily modify the position of the user on the bicycle, the invention enables a modification of the position of the crankset on the frame. The frame of the invention has a crankset box forming a main housing. The crankset box is situated at the junction of the first rod and the second rod. A detachable body member is mounted in the main housing. According to the invention, the shape of the detachable body member ensures that it is rotationally blocked in the main housing.

The detachable body member of to the invention has a special housing. The special housing of said detachable body member may be centered or off-centered relative to a center of the base of the detachable body member. The pedal is mounted in the special housing of the detachable body member. The special housing may be off-centered along a horizontal axis or along a vertical axis of the base of the detachable body member.

Thus, depending on the position of the special housing in the detachable body member, the distance between the saddle and the crankset and the tilt of the crankset-saddle axis may vary depending on the function of the detachable body member mounted in the main housing. For one and the same frame, the mounting of the different detachable body members thus modifies the height and the horizontal location of the crankset. It is therefore possible to propose detachable body members made to measure so as to obtain the exact desired horizontal and vertical position for the crankset.

Since the detachable body member can be easily changed, the device of the invention makes it possible to vary the position of a user of the bicycle while keeping the same frame. Thus, one and the same bicycle can be used by different users and can also enable one and the same user to practice different cycling disciplines without having to change frames for each discipline.

Furthermore, the device of the invention can be used to adapt the rigidity of the frame to different forms of cycling without changing the frame. The frame of the invention is rigid enough for competition but not too rigid for less intensive use and it is comfortable for lengthy outings or outings at slow speeds. The device of the invention can be used to vary the rigidity of the frame according to the stresses undergone by this frame.

When the cyclist is pedaling, deformations or changes in shape in the frame of the bicycle are induced because of the forces that the cyclist applies, inter alia, to the pedals and the handlebar. In the invention, these deformations are picked up by a deformation sensor. A sensor of this kind may be attached to the surface of the frame or integrated into its structure. In response, the sensor produces an electrical signal. The electrical signal can be collected and processed by an electrical circuit. The electrical signal, whether processed or not, is sent to an activator. An activator of this kind can be attached to the surface of the frame or integrated into its structure. Depending on the electrical signal received, the activator produces mechanical deformation in the frame. This deformation counters the initial deformation. The greater the extent to which the deformation in the frame is countered, the more rigid is the frame. The rigidity of the frame thus depends on the response of the activator and therefore on the electrical signal sent to it.

The more intensive the use of the bicycle, the greater are the deformations produced by the user. The greater these deformations, the greater is the electrical signal produced by the sensor as a function of the characteristics of said sensor. And the greater the electrical signal, the greater is the deformation prompted by the activator depending on the characteristics of the activator and therefore the greater the extent to which initial deformation is countered. The frame is then highly rigidified, depending on the characteristics of the activator.

Conversely, if the intensity of the form of cycling is lower, the deformations undergone by the frame are small. The electrical energy produced by the sensor is then proportionally weak and activator causes only little deformation in the frame. The frame therefore remains flexible and comfortable for less intensive forms of cycling.

The deformation prompted by the activator, and therefore the rigidity of the frame, can be controlled by control over the processing of the electrical signal which is done by the electrical circuit. The device of the invention therefore enables a frame, without special manipulation of the frame, to be used for different forms of cycling requiring different types of rigidity for said frame.

An object of the invention therefore is a bicycle comprising a frame, a saddle, a handlebar, a crankset box mounted in the frame and forming a main housing, a detachable body member whose shape is complementary to that of the main housing, mounted in said main housing, said detachable body member itself comprising a special housing, and a crankset mounted in the special housing of the detachable body member, wherein the shape of the detachable body member blocks it rotationally in the main housing.

A particular embodiment of the invention provides that the detachable body member will have the shape of a cylinder with an oblong or elliptical base.

A particular embodiment of the invention provides that the special housing will be off-centered relative to a center of the base of the detachable body member.

A particular embodiment of the invention provides that the detachable body member will be made of an aluminum alloy, steel or a composite material.

A particular embodiment of the invention provides that the bearing cups of the crankset are mounted in a depressed feature of the detachable body member, the special housing being situated in an extension of said depressed feature, the special housing forming a shoulder feature in the depressed feature of said detachable body member.

A particular embodiment of the invention provides that the detachable body member is mounted so as to be fixed in the main housing of the crankset box.

A particular embodiment of the invention provides that the detachable body member has two parts mounted on either side of the special housing. Preferably, these two parts are identical or result from one another by a geometric reflection.

A particular embodiment of the invention provides that the main housing will comprise a stop along its axial direction, the two parts of detachable body member being in contact with this stop on either side of said stop.

A particular embodiment of the invention provides that a fastening element will hold one part of the detachable body member against the stop.

A particular embodiment of the invention provides that the two parts of the detachable body member will be assembled by means of a sleeve.

Furthermore, an object of the invention is a bicycle comprising a frame, a saddle, a handlebar, a crankset box mounted in a frame, a crankset mounted in the crankset box, wherein the frame comprises a deformation sensor, a deformation activator and a means so that electrical energy resulting from the deformation undergone by the sensor is sent to the activator.

A particular embodiment of the invention provides that the frame will comprise an electric circuit, said electrical circuit being connected firstly to the sensor and secondly to the activator, the electrical energy produced by the sensor being transmitted to the electrical circuit, the electrical circuit processing said received electrical energy and an electrical signal resulting from said processing being transmitted to the activator.

A particular embodiment of the invention provides that the sensor and activator are piezoelectric elements.

A particular embodiment of the invention provides that the electrical circuit will comprise a means of storage of the energy.

An object of the invention is also a method to manage the rigidity of a frame of a bicycle, wherein the method comprises at least a step for the conversion of mechanical energy induced by the deformation of the frame into electrical energy by a deformation sensor, a step for conveying the electrical energy produced by said sensor up to a deformation activator, and a step of conversion of the electrical energy received by the activator into mechanical energy, said mechanical energy produced being introduced into said frame.

BRIEF DESCRIPTION OF THE DRAWINGS

The invention will be understood more clearly from the following description and the accompanying figures. These figures are given purely by way of an indication and in no way restrict the scope of the invention. Of these figures:

FIG. 3b is an enlarged view of the crankset box depicted in FIG. 3a.

DETAILED DESCRIPTION OF THE DRAWINGS

Figures 1, 2A, 2B:
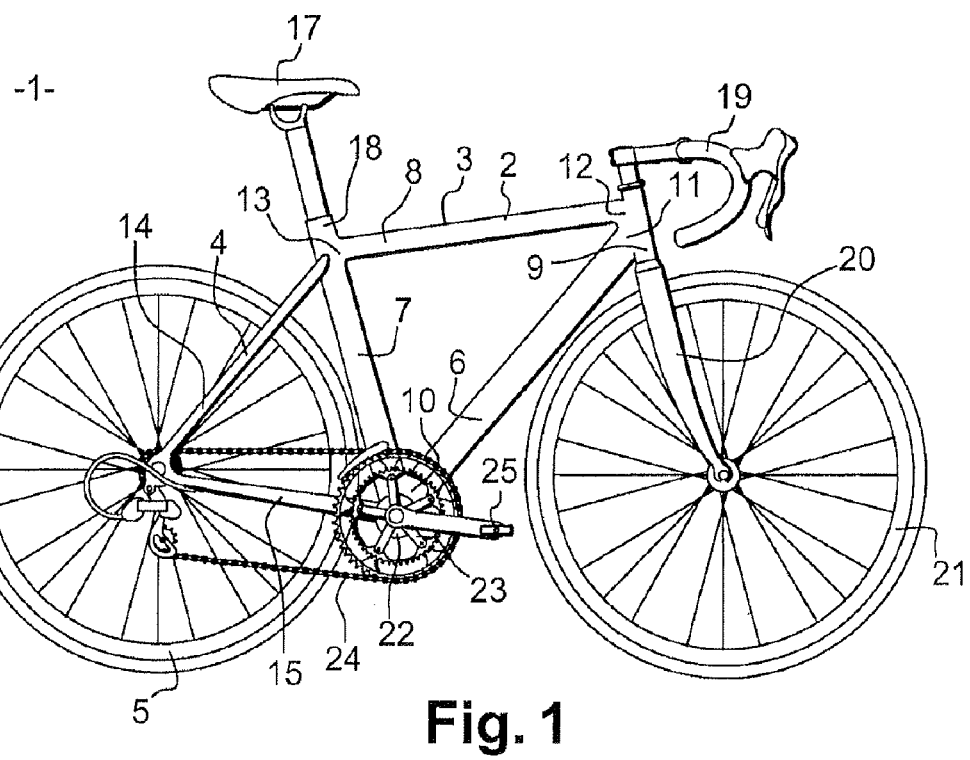
FIG. 1 is an elevational view of a bicycle.
FIG. 2a is a schematic, perspective view of a traditional bicycle frame.
FIG. 2b is a schematic, perspective view of a variant of a traditional bicycle frame.

FIG. 1 is a view in profile of a bicycle 1. A bicycle 1 has a frame 2. The frame 2 fulfils the role of a main structure in the bicycle 1. To this end, the frame 2 has a support structure 3 and a rear wheel support structure 4. The support structure 3 has a function of linking the different elements forming a bicycle 1. Such a support structure 3 also has the function of serving as a base of a seat for a user of the bicycle 1. The support structure of the rear wheel 4 is linked to the support structure 3 with a wheel 5 called a rear wheel 5.

The support structure 3 has a first rod 6, a second rod 7, a third rod 8 and a hinge 9. The rods 6, 7 and 8, as well as the hinge 9, are joined together in sets of two. The first rod 6 is linked by a first junction 10 to the second rod 7. The first rod 6 is linked by a second junction 11 to the hinge 9. The hinge 9 is linked by a third junction 12 to the third rod 8. The third rod 8 is linked by a fourth junction 13 to the second rod 7. The rods 6, 7 and 8, as well as the hinge 9, develop substantially in a same plane, called a plane of the frame 2.

The rear wheel support structure 4 has two struts 14 and two rear bases 15. Each strut 14 is linked to a rear base 15 by one of their respective ends. The rear bases 15 are connected by their other end to the support structure 3 at the first junction 10. Similarly, the struts 14 are connected by their other ends to the support structure 3. This linking of the struts 14 with the support structure 3 is obtained with the second rod 7 either directly or by means of a joining bar 16.

Many elements are shown in the frame 2. The rear wheel 5 is mounted on the rear wheel support structure 4. The rear wheel 5 is mounted so as to be rotationally free relative to an axis passing through the junctions between the rear bases 15 and the struts 14, the axis being perpendicular to the plane of the frame 2. A seat 17, which is typically a saddle 17, is mounted on the frame 2. More particularly, the saddle 17 is mounted on one end 18 of the second rod 7. This end 18 of the second rod 7 is situated so as to be close to the fourth rod 13. Furthermore, the end 17 is at a greater distance from the first junction 10 than the fourth junction 13.

A direction element 19, typically a handlebar 19, is mounted on the hinge 9. The handlebar 19 is mounted so as to be rotationally free about the axis of development of the hinge 9. The handlebar 19 is connected to a fork 20. The handlebar 19 and the fork 20 are fixedly joined in rotation. A wheel 21, called a front wheel 21, is mounted on the fork 20.

The first junction 10 has a crankset box 22. More particularly, the first junction 10 forms the crankset box 22. In present-day bicycles 1, a crankset 23 is mounted on this crankset box 22. The crankset 22 is connected to the rear wheel 5 by a chain 24.

The geometry of the frame 2 and the elements mounted on the frame 2 determine the position of a user of the bicycle 1. Typically, a cyclist applies pressure with his feet on the pedals 25 of the crankset 23, with his buttocks on the saddle 17 and his hands on the handlebar 19. For example, a frame 2 designed for a triathlon has a first rod 6 and a third rod 8 that are shorter than the similar rods 6 and 8 in a bicycle 1 designed for racing on the road.

FIGS. 2a and 2b respectively show a schematic view in perspective of a traditional bicycle frame and a schematic view in perspective of an alternative embodiment of a traditional bicycle frame.

FIG. 2a shows frame 2 in which the struts 14 are directly connected to the second rod 7. In a frame 2 such as this, the junction between the struts 14 and the second rod 7 is situated between the end 18 of the second rod 7 and the fourth junction 13.

FIG. 2b shows a frame 2 in which the struts 14 are not directly connected to the second rod 7. In a frame 2 of this kind the joining bar 16 links up the arms 14 and the second rod 7. The struts 14 are joined to a first end 26 of the joining bar 16. The joining bar 16 is itself linked to the second rod 7. More particularly, a second end 27 of the joining bar 16 is connected to the second rod 7.

Figure 3A:
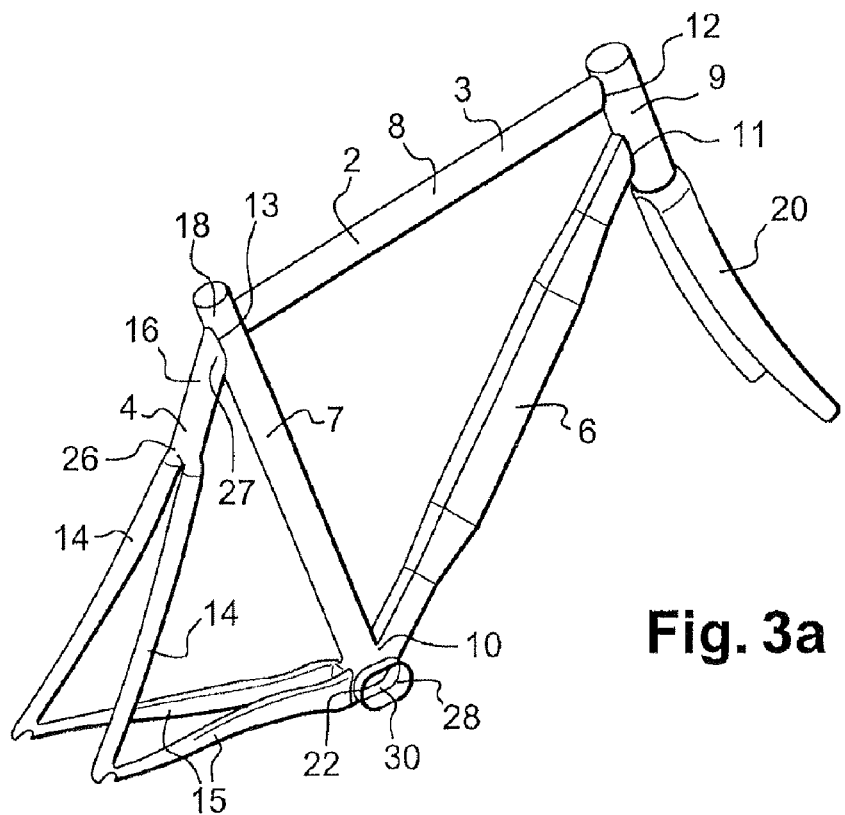
FIG. 3a is a schematic, perspective view of a bicycle frame according to one embodiment of the invention.
Figure 3B:
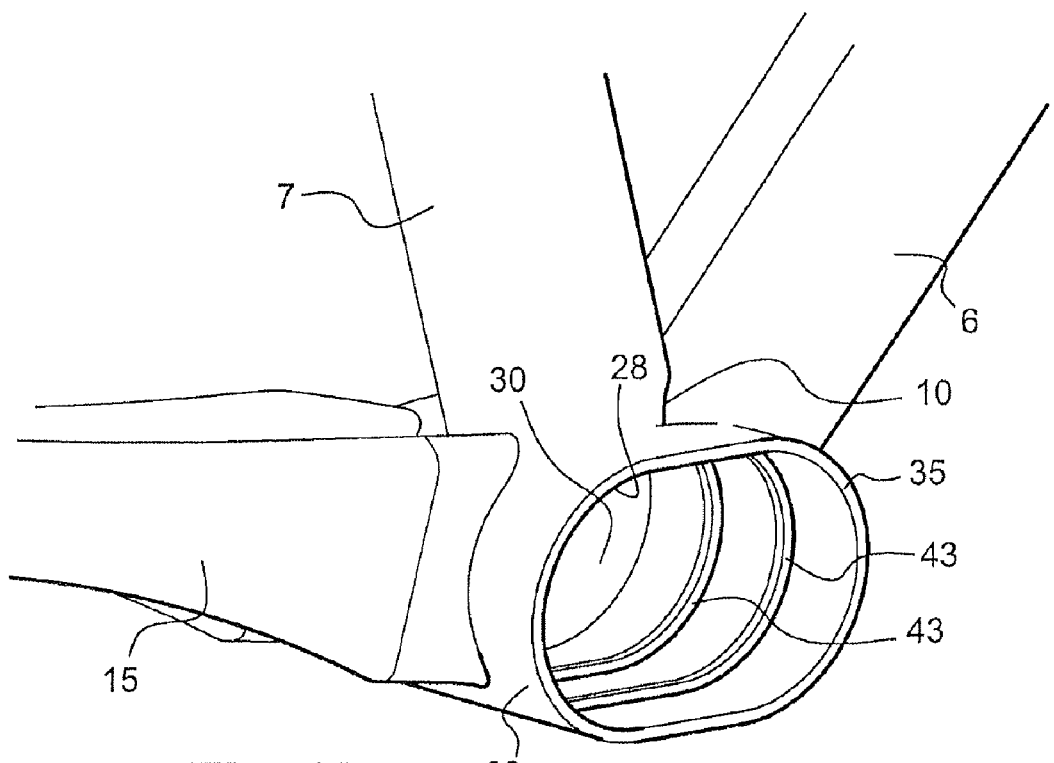

FIG. 3a is a schematic view in perspective of a bicycle frame according to one embodiment of the invention. FIG. 3b is a close-up view of the crankset box shown in FIG. 3a.

The frame 2 in this embodiment of the invention makes it easy to modify the relative positions of the elements determining the position of a user of the frame 2 according to the invention. More particularly, the frame 2 enables the position of the crankset 23 on the frame 2 to be easily modified. When the position of the crankset 23 on the frame 2 is modified, the tilt of the axis going through the saddle 17 and the crankset 23 as well as the distance between the saddle 17 and the crankset 23 are modified. This modification leads to the desired change in position of the user on the bike 1. This change in tilt and distance can also enable many different users to use the same bike 1.

The crankset box 22 forms a main housing or housing 28. The main housing 28 is a cylindrical hole having a base situated in a plane parallel to the plane of symmetry of the frame 2. In a preferred form of the invention, the base of the main housing 28 has an elliptical, oblong, rectangular, square or hexagonal shape.

Figure 4:
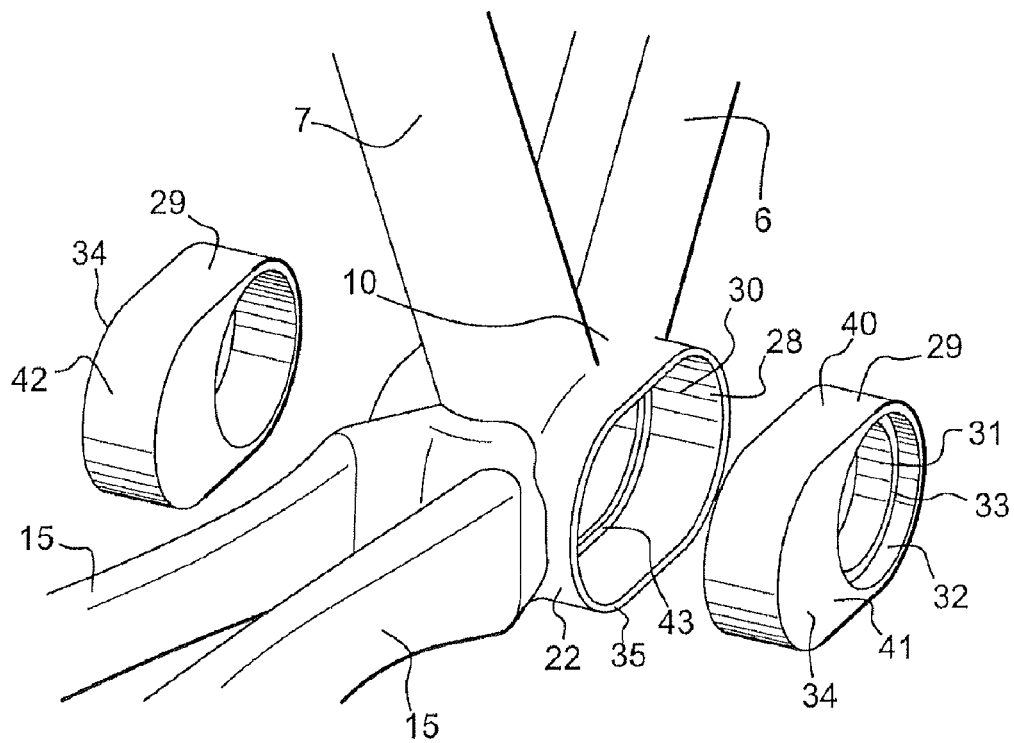
FIG. 4a is a fragmentary, exploded, schematic, perspective view in perspective of a bicycle frame according to an embodiment of the invention, with the detachable body member in two parts, before the mounting of the detachable body member in the crankset box.

FIG. 4 is a partial schematic view in perspective of a bicycle frame according to one embodiment of the invention, with a detachable body member in two parts, before the mounting of the detachable body member in the crankset box.

A detachable body member 29 is mounted in the main housing 28. The detachable body member 29 may be a solid or hollow body member. The detachable body member 29 has a shape complementary to that of the main housing 28. Typically, the detachable body member 29 mounted in the frame 2 takes up all of the internal space 30 of the main housing 28.

The shape of detachable body member 29 ensures that it is rotationally locked into the main housing 28, in contrast to shapes such as a circular-based cylinder for the main housing 28 and the detachable body member 29.

According to an embodiment of the invention, the base of the cylinder forming the detachable body member 29 has a symmetrical shape. It has, for example, at least one axis of symmetry. A symmetrical shape of this kind enables the mounting of the detachable body member 29 in the main housing 28 in several different ways. In one form of the invention, the base of the cylinder forming the detachable body member 29 has an elliptical, oblong, rectangular, square or even hexagonal shape.

The detachable body member 29 has a special housing 31. The special housing 31 is cylindrical. Its preferably circular base is situated in a plane parallel to the plane of symmetry of the frame 2 and its generatrix line is perpendicular to the plane of symmetry of the frame 2. The crankset 23 is mounted in the special housing 31 of the detachable body member 29. The special housing 31 can be threaded so that models of crankset 23 bearing cups having a corresponding thread can be screwed into them. The thread may be an Italian or English thread depending on the type of thread in the crankset 23 bearing cups that the user wishes to use. Similarly, since there are several types of crankset 23 bearing cups, it is possible to create different detachable body members 29 so that they can receive any type of crankset 23 attachment, whether in terms of the size of bearing cup or the type of attachment proper, and can receive these elements typically by compression or screwing in. In the event of the use of bearing cups that have no thread, the internal surface of the special housing 31 is not threaded.

In an embodiment of the invention, the detachable body member 29 has a depressed feature 32. The special housing 31 is situated in the extension of the depressed feature 32, the depressed feature 32 having a diameter greater than the diameter of the special housing 31. The special housing 31 thus forms a shoulder feature 23 in the depressed feature 32. This depressed feature 32 can take all or part of the bearing cups of the crankset 23.

The detachable body member 29 can be made out of different materials, for example aluminum alloy, steel, polymer or composite material. After mounting, the external faces 34 of the detachable body member 29 are within the main housing 28 or in the alignment of the external walls 35 of the crankset box 22. A slight offset, of the order of some millimeters, to the interior or exterior of the frame 2 relative to the said walls 35, can however be envisaged.

Figure 5A:
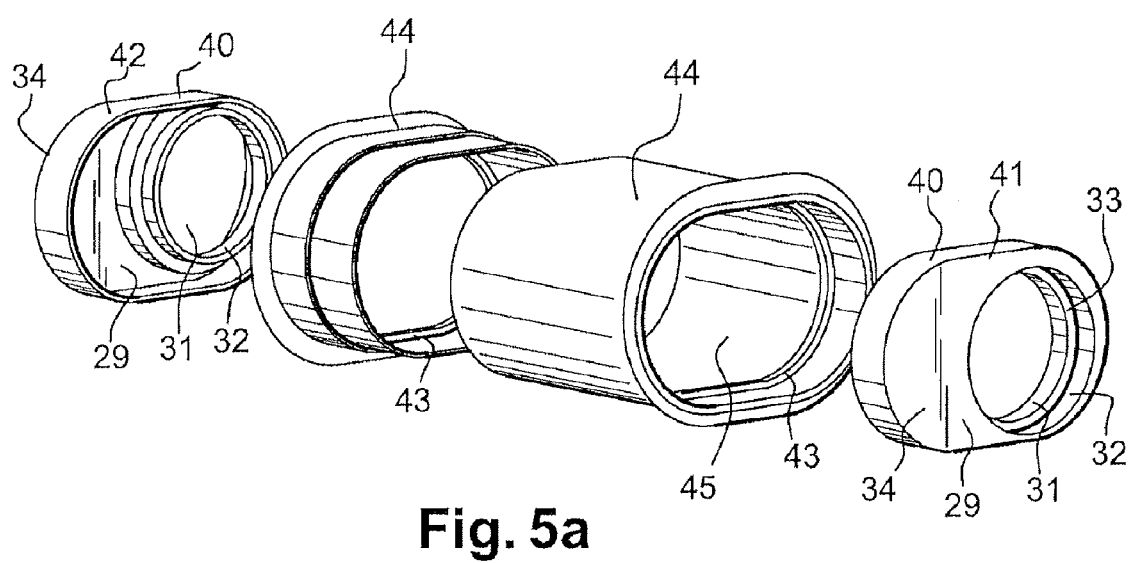
FIG. 5a is an exploded, schematic, perspective view of a detachable body pursuant to an embodiment of the invention.
Figure 5B:
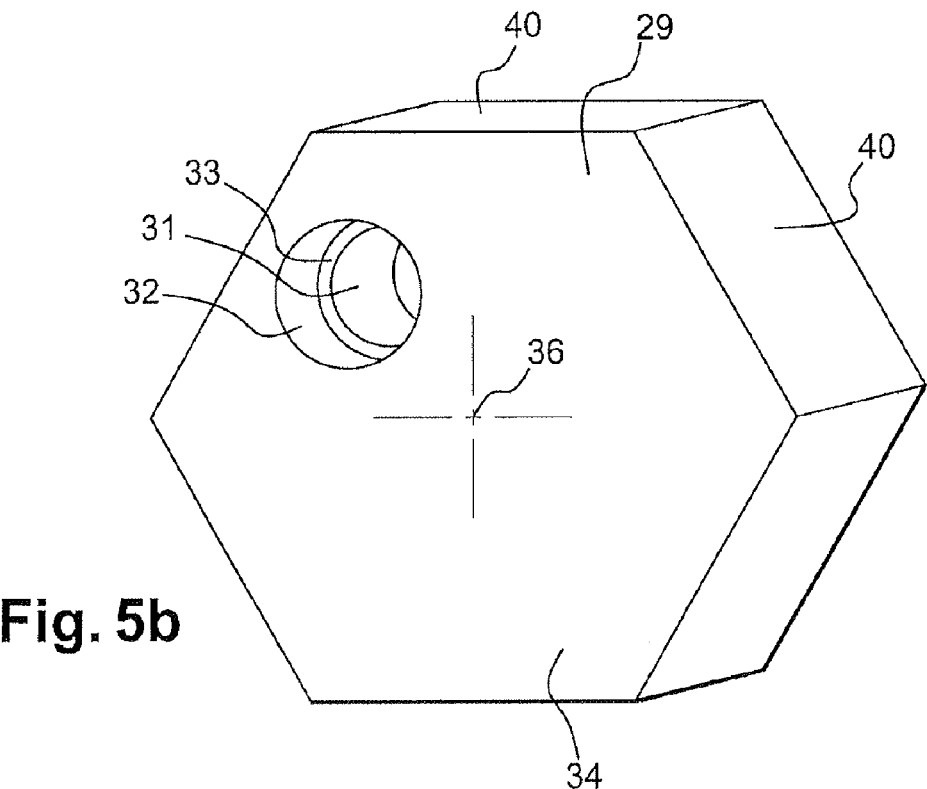
FIGS. 5b and 5c are schematic, perspective views of detachable bodies of embodiments of the invention.
Figure 5C:
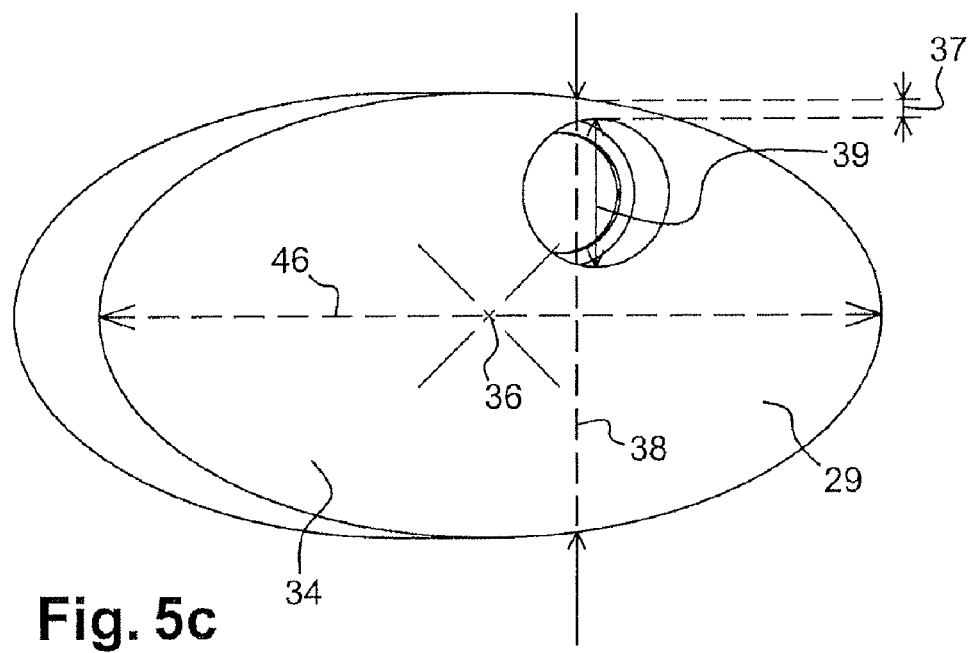

FIGS. 5a, 5b and 5c show schematic views in perspective of detachable bodies according to alternative embodiments of the invention.

The position of the special housing 31 in the detachable body member 29 can be different from one detachable body member 29 to the other. Thus, according to the detachable body member 29 chosen to be mounted in the main housing 28, the special housing 31 in which the crankset 23 is mounted may be situated differently relatively to the saddle 17. For a same frame 2, it then becomes possible according to the invention to modify the tilt of the axis passing through the saddle 17 and the crankset 23 and/or the distance between the saddle 17 and the crankset 23. The special housing 31 can be off-centered, along a vertical axis or along a horizontal axis or even both at the same time relatively to a center 36 (FIGS. 5b and 5c) of a face 34 of the detachable body member 29.

FIG. 5a shows a schematic view in perspective of a cylindrical detachable body member having an oblong base. The term "oblong" is understood to mean a shape corresponding to two identical semi-circles, attached on either side to a rectangle, the diameter of the semi-circles being equal to the length of the sides of the rectangle attached to them. In one variant of the invention shown in FIG. 5a, the special housing 31 of the detachable body member 29 is off-centered horizontally and vertically relatively to the center of the faces 34. The axis of the special housing 31 may be off-centered by a distance ranging from 0.1 mm to 3 cm and preferably a distance of 1 cm relatively to the center of the faces 34. A horizontal offset of 1 cm relatively to the central position leads to a change of about one degree in the tilt of the axis going through the saddle 17 and the crankset 23. It is possible to use horizontal sliding derailleur attachments. In a preferred embodiment of the invention the difference in horizontal length between the detachable body member 29 and the special housing 31 ranges from 0.5 cm to 9 cm. The different off-centered positions of the special housing 31 can then be distant from each other by a length ranging from 0 to 3 cm relatively to the central position.

The presence of a plane face 40 on the detachable body member 29 prevents a rotation of said detachable body member 29 in the main housing 28. Furthermore, the oblong shape of the elements 28 and 29 enables the detachable body member 29 to be mounted in two different positions in the main housing 28. Thus, when the special housing 31 of the detachable body member 29 is off-centered, the horizontal shift obtained may be in one sense or another. This is also the case for the vertical shift.

In an embodiment of the invention, the detachable body member 29 has two parts. Preferably, these two parts are identical in shape or result from one another by a geometric reflection. A first part 41 is mounted with one side of the main housing 28. A second part 42 is mounted on the opposite side of the main housing 28. A detachable body member 29 of this kind, in two parts 41 and 42, is easier to mount in the crankset box 22.

To prevent the detachable body member 29 from going beyond one side or the other of the main housing 28, a stop 43 in the axial direction may be obtained in the main housing 28. During the mounting of the two parts 41 and 42 in the first main housing 28, the two parts 41 and 42 of the detachable body member 29 are mounted so as to come into contact with the stop 43 on either side of the stop. A stop 43 of this kind enables a user to ensure that the two parts 41 and 42 are in the right position.

As shown in FIG. 5a, there may also be two stops 43, the two parts 41 and 42 each coming into contact with a stop 43.

A stop 43 of this kind may be made directly in the main housing 28. As shown in FIG. 5a, it can also be made in an adaptation chamber 44. An adaptation chamber 44 of this kind is an additional part placed in the main housing 28 and having a shape complementary to that of the main housing 28. The adaptation chamber 44 is hollow so that the detachable body member 29 is inserted not directly into the main housing 28 but into the adaptation chamber 44. The detachable body member 29 then has a shape that is complementary no longer for the main housing 28 but to an internal space 45 of the adaptation chamber 44.

In order to keep the detachable body member 29 accurately positioned in the main housing 28, a fastening element may be planned. A fastening element of this kind may, for example, be a screw that goes through the detachable body member 29 and the crankset box 22. A screw of this kind maintains a part of said detachable body member 29 against the stop 43.

FIG. 5b shows a hexagonal detachable body member 29 according to one alternative embodiment of the invention. A hexagonal shape of this kind enables the detachable body member 29 to be positioned in six different positions in the main housing 28. According to the alternative embodiment of the invention shown in FIG. 5b, the special housing 31 of the detachable body member 29 is off-centered. The six possible positions of the off-centered special housing 31 give the user the possibility of adjusting the position of the crankset 23 both vertically and horizontally. A same detachable body member 29 therefore can be used to obtain six different positions of the crankset for a same frame 42. The presence of plane faces 40 on the detachable body member 29 blocks the body member 29 rotationally when a user is pedaling.

FIG. 5c shows another alternative embodiment of a detachable body member according to the invention. In this variant, the elliptical shape of the base of the detachable body member 29 rotationally blocks said detachable body member 29 in the main housing 28. In the form of the invention shown in FIG. 5c, the following dimensions can be used for example: the circular base of the special housing 31 has a diameter of 33 mm. The depressed feature 32 has a circular diameter of 39 mm. The axes of the ellipse forming the base of the detachable body member 29 has lengths of 52 mm and 66 mm.

It is possible to manufacture detachable bodies 29 with a special housing 31 positioned to measure at a user's request. For example, if a user makes an ergonomic study in order to determine his preferred position on a bicycle 1, the user will obtain the exact angle suitable for the tilt of the axis going through the saddle 17 and the crankset 23. It is then possible to manufacture a detachable body member 29 with a special housing 31 positioned to a precision of plus or minus 1 mm in order to obtain the angle desired with a precision of the order of one tenth of an angle.

According to an embodiment of the invention, a distance 37, called a guard distance 37, between the edge of the detachable body member 29 and the special housing 31 or the depressed feature 32 has a size of at least 3.5 mm. Furthermore, the height 38 of the detachable body member 29, along a vertical axis passing through the center of the circular base of the special housing 31, is at least equal to twice the guard space 37 plus the diameter 39 of the circular base of the special housing 31.

Figure 6:
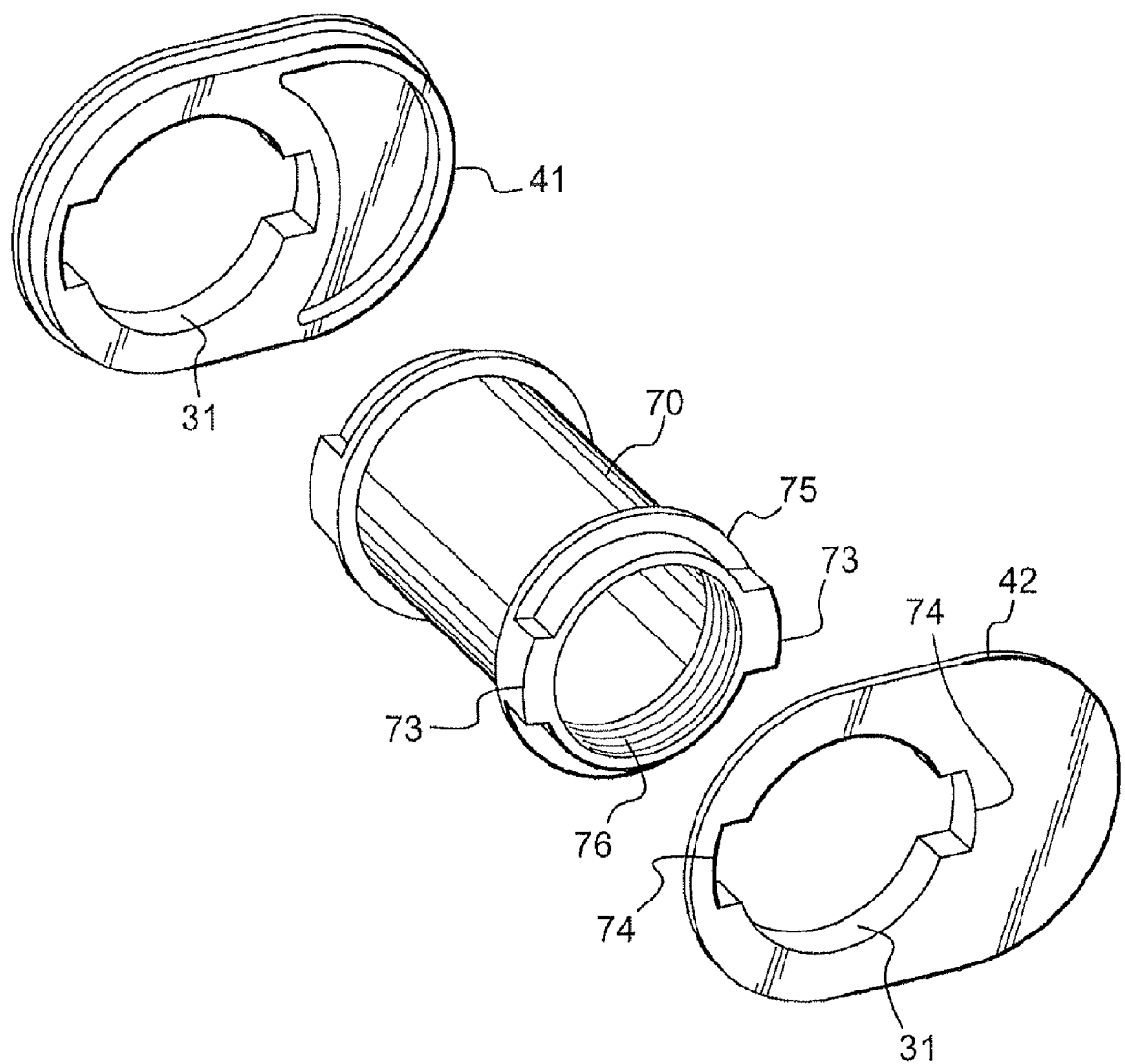
FIG. 6 is an exploded, schematic, perspective view of a detachable body member according to another embodiment of the invention.

FIG. 6 is a schematic view in perspective of a detachable body member depicted in an exploded view, according to another embodiment of the invention. In this embodiment, the two parts 41 and 42 of the detachable body member are assembled by means of a sleeve 70. The sleeve 70 has the shape of a circular-based cylindrical tube. The ends 71, 72 of the sleeve 70 get clamped into the housing 31 of the parts 41 and 42.

Preferably, the sleeve 70 is mounted fixedly in parts 41 and 42 of the detachable body member. This assembly can by obtained for example by the embedding of studs 73 into the corresponding holes 74 of the special housing 31.

Preferably, the sleeve is equipped with stops 75, preventing the ends 73 of the 70 sleeve from being pushed too far into the special housing 31. Preferably, the sleeve is equipped with stops 75 preventing the ends 73 of the sleeve 70 from penetrating too deeply into the special housing 31.

Preferably, when sleeve 70 is joined to the parts 41 and 42, the ends 73 of the sleeve 70 are within the housing 31 without going beyond the housing on either side. Thus, when the crankset cups are being mounted on the ends of the sleeve 70, the cups rest on the parts 41 and 42 of the detachable body member 29 and not on the ends 73 of the sleeve 70.

Preferably, the ends 73 of the sleeve are provided with a thread 76 so that the crankset cups can be threadably received by the sleeve.

The value of this embodiment of the invention is that it provides for a lightweight detachable body member 29 while at the same time ensuring the alignment of the special housings 31 designed to receive the shaft of the crankset.

Figure 7:
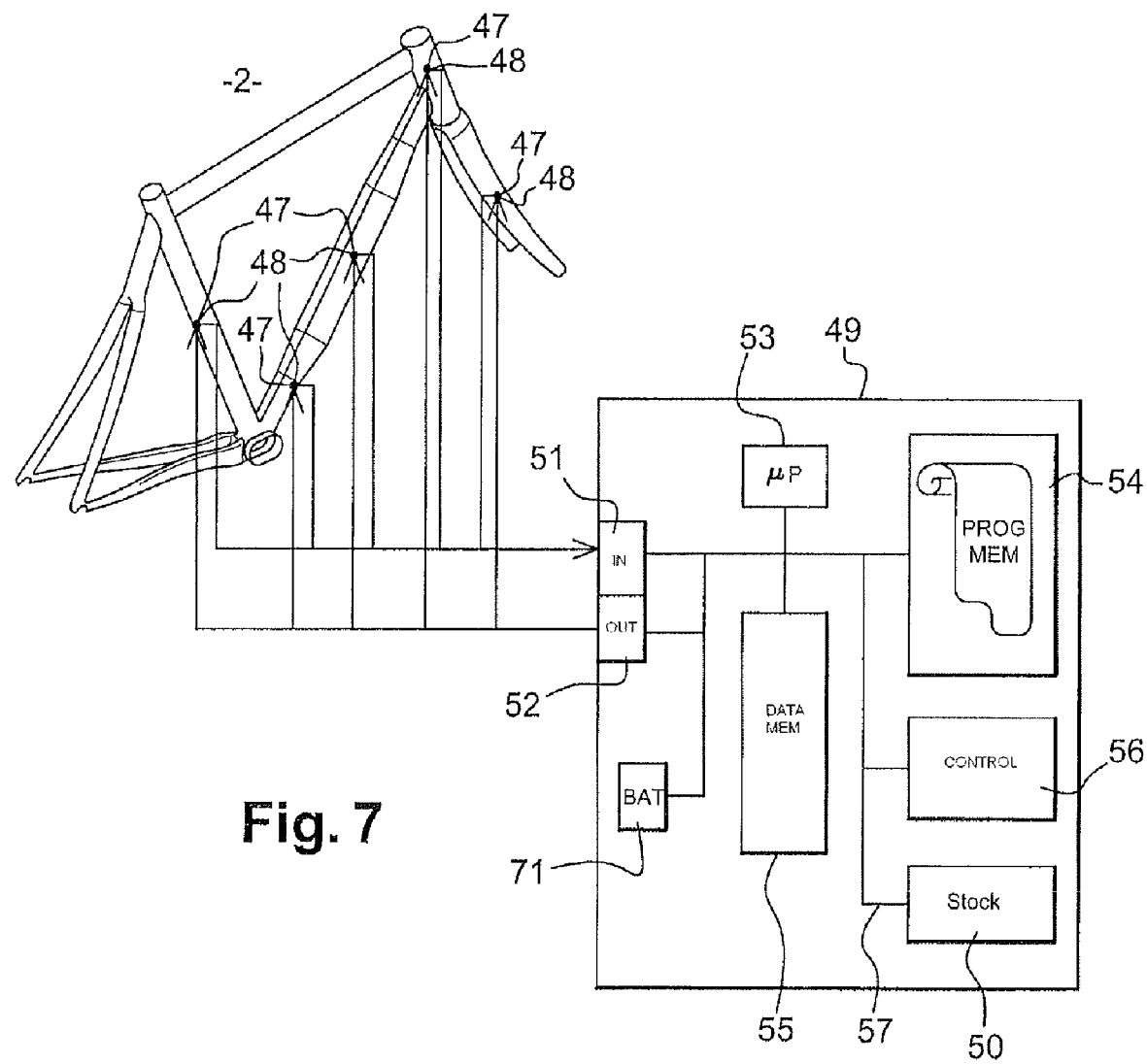
FIG. 7 is a schematic view of a frame according to another embodiment of the invention.

FIG. 7 is a schematic view in perspective of a frame according to another embodiment of the invention. Another method for adapting a bicycle 1 to different types of users is to modify the rigidity of the frame 2 depending on the use or the user. When pedaling, the cyclist applies stresses to the different parts of the bicycle 1 in pressing on the pedals 25 and in pulling on the handlebar 19. These stresses give rise to deformations. The deformations are proportional to the force with which the cyclist is pedaling. The more flexible the bicycle 1, the greater will be these deformations. The greater the deformations, the less efficient will be the pedaling. However, the more comfortable the bicycle 1, the easier it is to pedal at low speed. The more rigid the bicycle 1, the smaller the deformation. The smaller the deformation the more efficient will be the pedaling and the greater the possibility of achieving maximum performance especially during competitions.

The device of the invention enables the management the rigidity of the frame 2 without modifying this frame 2. To this end, the device according to the invention provides for a conversion of mechanical energy, induced by the deformation of the frame 2 during the use of the bicycle 1, into electrical power. This electrical power is then transmitted to an actuator 47, which reconverts this electrical energy into mechanical energy. The mechanical energy obtained by this actuator 47 is reintroduced into the frame 2 in order to counter the deformation produced by the pedaling. This introduction of mechanical energy produced by the actuator 47 into the frame stiffens said frame 2.

In a competition, the deformations undergone by the frame 2 are great. The conversion of these deformations into electrical energy and then into mechanical energy reintroduced into the frame 2 stiffens the frame 2. This stiffness or rigidity is necessary for a competition frame 2. Conversely, when the frame 2 of the invention is used for leisurely cycling, it undergoes little deformation. This low presence of deformation gives rise to low conversion into electrical energy and then into mechanical energy. Thus, the mechanical forces reintroduced into the frame 2 are low, according to the characteristics of the actuator 47. The frame 2 therefore remains fairly flexible to provide the comfort needed for leisurely cycling.

The frame 2 in this embodiment of the invention comprises at least one deformation sensor 48. Such a sensor 48 can be directly integrated into the frame 2 or again bonded to the frame 2. The frame 2 in this embodiment of the invention comprises at least deformation actuator 47. Like the sensor 48, an actuator 47 of this kind can be integrated into the structure of the frame 2, bonded to the frame 2 or any other means enabling it to fulfill its function.

The deformations can be quantified and located by means of a study using the finite element method. These deformations are situated on different parts of the frame to such as the ends of the rear bases 15, the ends of the struts 14, the crankset box 22, the ends of the first rod 6, in the lower part of the second rod 7, the fork 20 linked to the handlebar 19 and the hinge 9. These deformations are chiefly deflection, compression and strain on these parts of the frame 2. To enable a wider range of rigidity to be attained, it is possible to make the structure of more flexible at the positions in which the sensor 48 and the actuator 47 are placed.

Those parts at which the deformations are the greatest are the preferred locations of the sensor 48. Such a sensor 48 may be piezoelectric composite material or any other deformation sensor 48 which sends an electrical signal in response to deformation.

A piezoelectric material produces a deformation in response to an electrical signal that it receives and produces an electrical signal in response to a deformation that it undergoes. The deformation and the electrical signal are proportional. A sensor 48 made out of the material of this kind can be flexible so that it can be bonded more easily to the surface of the frame 2 or integrated into its structure. Said sensor 48 may be made of piezoelectric ceramic fibers aligned in parallel in a given direction and surrounded by a matrix of a relatively soft and deformable polymer. The fibers of the piezoelectric ceramic fibers may be lead-zirconate-titanate (LZT) fibers. The sensor 48 may comprise fibers of any other material as well as additives in the polymer to improve the elastic or electrical properties. The piezoelectric composite material may also include flexible and conductive electrodes. Other layers of polymer may be placed above or between the different components of the composite in order to ensure conductivity or adhesion between the layers. The piezoelectric ceramic fibers may all be polarized in a given same direction. The maximum efficiency in the direction of the fibers can be obtained by polarizing the fibers along their length.

The electrical energy resulting from the deformations undergone by the sensor 48 is then sent to the actuator 47. The actuator 47 receives this electrical energy and then converts it into mechanical energy. An actuator 47 may be constituted by at least one piezoelectric, antiferroelectric, electrostrictive, piezomagnetic, magnetostrictive or shape memory material. An actuator 47 may be a piezoelectric composite material.

The electrical energy produced by the actuator 47 is reintegrated into said frame 2. The sensor 48 and the actuator 47 may be introduced in rods in the case of hollow frame 2 rods. As in the case of the sensor 48, the actuator 47 may be situated at positions undergoing the most deformations in the frame 2. This location of the actuator 47 enables the deformations to be countered with the greatest efficiency and therefore enables the frame to be stiffened to the utmost. Furthermore, it is possible to choose a sensor 48 and an actuator 47 made of different materials in order to produce varying levels of electrical energy for the sensor 48 and varying levels of mechanical deformation for the actuator 47, depending on the desired form of cycling desired. In the case of bonded sensors 48 and bonded actuators 47, these elements can be easily be positioned in order to easily modify said characteristics according to the planned form of cycling.

It is also possible, when there are several sensors 48 and/or several actuators 47 on the frame 2, to supply electrical energy to an actuator 47 from several sensors 48. Conversely, a single sensor 48 can power several activators 47. Here again, this possibility enables the most efficient management of the rigidity of the frame 2. It is also possible to envisage a case where a sensor 48 can also be an actuator 47.

Figure 8:
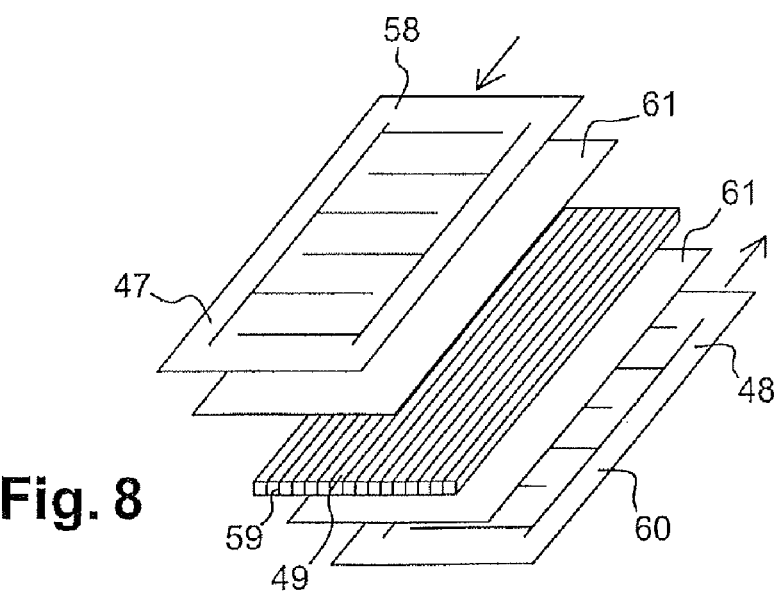
FIG. 8 is an exploded, schematic, perspective view of an electrical circuit according to one variant of this other embodiment of the invention.

FIG. 8 is a schematic exploded view in perspective of an electrical circuit according to one embodiment of the invention. In order to manage the rigidity of the frame 2 as efficiently as possible, an electrical circuit 49 can be integrated into the frame 2. The electrical circuit 49 is connected to at least one sensor 48. The electric energy produced by the sensor 48 when the sensor 48 undergoes deformation is then transmitted to the electric circuit 49. The electrical circuit 49 then processes this electrical power. A processing operation of this kind may, for example, consist of a filtering, an amplification, a dissipation or again a storage of the electrical power. The electrical circuit 49 may carry out any other processing operation to improve the active control of the rigidity of the frame 2. An electrical circuit 49 such as this may consist of several arms which process the signal in different ways. The electrical circuit 49 may have a switch to direct a given signal to one arm or to another arm of the electrical circuit 49. A processing operation of this kind makes it possible to choose the intensity of the response of the actuator 47 and hence the rigidity of the frame 2. The electrical circuit 49 is placed on or integrated into the frame 2. The electrical circuit 49 may be placed within the rods of the frame or else fixed to the surface of the frame 2. The processing done by the electrical circuit 49 depends entirely on the chosen electrical circuit 49. In the case of an electrical circuit 49 bonded to the frame 2, it is preferably easily interchangeable with another electrical circuit 49 so that the characteristics of said electrical circuit 49 integrated into the frame 2 can be easily modified.

Controls on the deformations can be done by an active control system. The active control system may be a negative feedback control system. The structure of the negative feedback loop may be constituted by the structure of the frame 2 which undergoes deformation, at least one sensor 48 that undergoes the same deformation and produces electrical power in response. An amplifier of the sensor 48 adapts the electrical signal measured at the output of the sensor 48 so it is compatible with the rest of the control sequence. An anti-aliasing filter is used to prevent spectral aliasing phenomena. The structure may comprise an analog/digital converter. A controller computes the command introduced into the amplifier of an actuator of a digital/analog converter. A reconstruction filter smoothens the control signal of the controller sent to the actuator, eliminating the undesired high frequencies. A voltage amplifier adapts the signal so it is compatible with the actuator. An actuator, in response to a deformation command electrical signal deforms the structure to counter the initial deformation undergone by this structure.

The controller may be programmed so that it is able to apply different processing operations to the signals that it receives from the sensor 48 before sending it to the actuator 47. It is possible to plan for a switch by which the user can choose the intensity of the response of the actuator 47 and therefore the rigidity of the frame in choosing the processing of the electrical signal.

The electrical circuit 49 is connected to at least one actuator 47. The electrical signal resulting from the processing by the electrical circuit 49 is then sent to the actuator 47. The electrical circuit 49 therefore enables the most efficient possible management of the mechanical energy reintroduced into the frame 2 by the actuator 47. An electrical circuit 49 of this kind may comprise an energy storage device 50. The connection between the sensor 48, the actuator 47 and the electrical circuit 49 may be done by means of at least one electrical wire. The electrical wire may be flattened and integrated into the structure of the rods of the frame 2. The electrical wire can circulate outside the rods of the frame 2 or inside the frame 2. The frame 2 can be used as a ground of the electrical circuit. If the material constituting the frame 2 is not conductive, or not sufficiently conductive, it is possible to add a constituent material with the original shape of the frame 2 to improve the conductivity of said frame 2. It is thus possible, in the case of a frame 2 of a bicycle 1 made of carbon fibre reinforced composite material, to add for example carbon nanotubes made out of the resin used to improve the conductivity of the composite material or add a layer of conductive material on or in the structure of the rods. Should the frame 2 be used as a ground, fewer wires will be needed to make connections between the sensor 48, the electrical circuit 49 and the actuator 47. This reduction of connections reduces the potential problems that may be caused by the wires such as wear and tear, breakdown, integration into the structure, problems related to aesthetics, etc.

In order to process the electrical energy properly, an electrical circuit 49 of this kind comprises an input interface 51, an output interface 52, a microprocessor 53, a program memory 54, a data memory 55, a control pack 56 and a communications bus 57. The input interface 51 receives all the electrical signals. The communications bus 57 connects all the elements of the electrical circuit 49 to one another. The data memory 55 can be used to store information needed for the processing. The processing is done by the microprocessor 53 on the basis of a processor program. The processor program can be stored in the program memory 54. The result of the processing of the electrical signal by the microprocessor 53 is sent to the output interface 52 which then sends the electrical signal corresponding to the processing being done. The control pack 56 can be used by a user to choose a particular processor program, for example by means of a switch or again a pushbutton. A control pack 56 of this kind may comprise a display device by which a user can obtain information on the program in progress or on the possible programs.

The sensor 48, the actuator 47 and the electrical circuit may be combined in a single rigid part, for example in the form of three joined plates insulated from one another by insulator plates. Thus, a first plate 58 may be a sensor 48 made out of piezoelectric material, a second plate 59 may be the electrical circuit 49 and a third plate 60 may be an actuator 47 made out of piezoelectric material. An insulator plaque 61 is then situated on either side of the electrical circuit 49 between the electrical circuit 49 and, on the one hand, the sensor 48 and, on the other hand, the actuator 47. The stiffening part then takes the form of the five plates joined together.

A battery 71 can be added providing additional electrical energy to the actuator 47 to cope with energy losses in the device according to the invention. In particular, there are substantial energy losses during the conversion of mechanical energy into electrical power when a piezoelectric element is deformed. The battery 71 can also be used to power the controller. The battery 71 can be powered with batteries or by any other energy source present in the bicycle.

The invention claimed is:

1. A bicycle comprising:
   a frame;
   a saddle;
   a handlebar;
   a crank set box mounted in the frame and forming a main housing;
   a detachable body member defining a shape complementary to that of the main housing and comprising a special housing, the detachable body member mounted in said main housing and forming a cylinder having a base defining an elliptical, oblong, rectangular, square or hexagonal shape, so as to be rotationally blocked in the main housing, the special housing vertically off-centered relative to a center of the base of the detachable body member; and
   a crank set mounted in the special housing of the detachable body member.

2. A bicycle according to claim 1, wherein the detachable body member is made of an aluminum alloy, steel or a composite material.

3. A bicycle according to claim 1, wherein the detachable body member comprises a depressed feature, the special housing being situated in an extension of said depressed feature, the special housing forming a shoulder feature in the depressed feature of said detachable body member.

4. A bicycle according to claim 1, wherein the detachable body member is mounted so as to be fixed in the main housing of the crank set box.

5. A bicycle according to claim 1, wherein the detachable body member has two parts mounted on either side of the special housing.

6. A bicycle according to claim 5, wherein the main housing comprises a stop, the two parts of the detachable body member being in contact with this stop on either side of said stop.

7. A bicycle according to claim 6, wherein a fastening element will hold one part of the detachable body member against the stop.

8. A bicycle according to claim 5, wherein the two parts of the detachable body member will be assembled by means of a sleeve.

9. A bicycle according to claim 1, wherein the special housing is horizontally off-centered relative to the center of the base of the detachable body member.

10. A bicycle according to claim 5, wherein the two parts of the detachable body member are identical in shape or resulting from one another by a geometric reflection.

* * * * *